United States Patent [19]
Watanabe et al.

[11] Patent Number: 5,991,642
[45] Date of Patent: Nov. 23, 1999

[54] MOBILE COMMUNICATION SYSTEM HAVING A CONTROL STATION WHICH SELECTS SPEECH CODING SCHEMES FOR A MOBILE STATION

[75] Inventors: Yasuyuki Watanabe; Noriya Nakaima, both of Yokohama; Kouji Yamamoto, Sayama; Moritoshi Katuta, Yokohama, all of Japan

[73] Assignee: NTT Mobile Communications Network Inc., Tokyo, Japan

[21] Appl. No.: 08/712,053

[22] Filed: Sep. 10, 1996

Related U.S. Application Data

[63] Continuation of application No. PCT/JP96/00013, Jan. 9, 1996.

[30] Foreign Application Priority Data

Jan. 10, 1995 [JP] Japan .................................. 7-002207
May 12, 1995 [JP] Japan .................................. 7-114903

[51] Int. Cl.⁶ .................................................. H04Q 07/38
[52] U.S. Cl. .......................... 455/560; 455/553; 455/436; 455/517; 455/433
[58] Field of Search ................................ 455/550, 552.3, 455/422, 433, 435, 436, 464, 513, 517, 413, 414, 423, 450, 466, 445, 557, 60

[56] References Cited

U.S. PATENT DOCUMENTS

| | | | |
|---|---|---|---|
| 5,471,645 | 11/1995 | Felix .................................... | 455/513 X |
| 5,487,175 | 1/1996 | Bayley et al. ....................... | 455/557 X |
| 5,574,973 | 11/1996 | Borth et al. ............................. | 455/435 |
| 5,590,172 | 12/1996 | Lodwig et al. .......................... | 455/436 |

FOREIGN PATENT DOCUMENTS

| | | |
|---|---|---|
| 6-6295 | 1/1994 | Japan . |
| 7-30947 | 1/1995 | Japan . |

OTHER PUBLICATIONS

Masami Yabusaki et al, "Voice Communication Connection Control in Digital Public Land Mobile Networks", IEICE Trans Fundamentals, vol. E75–A No. 12 Dec. 1992.

Kazuo Sugiyama et al "Network Control for Carring Multiple Coded Voices and Non–Voices" NTT Mobile Communications Network Inc. Research and Development Department.

H. Nakamura et al "Call Control Protocol For Digital Cellular Radio Interface" Vehicular Technology Society..., May 10–13, 1992.

*Primary Examiner*—Wellington Chin
*Assistant Examiner*—Philip J. Sobutka
*Attorney, Agent, or Firm*—Pillsbury Madison & Sutro LLP

[57] ABSTRACT

Communication is carried out on the basis of an optimum speech coding scheme that is matched to the speech coding schemes provided by the radio zones, and to the speech coding capabilities of the mobile stations. To achieve this, when a traffic channel is set up between a mobile station and a switch, a traffic channel selection condition that has been specified by the switch on the basis of the speech coding capabilities of the mobile station that made the SETUP request and of the mobile station to which the call is made, is stored in the control station. The control station grasps which speech coding scheme is currently being used in the radio zone which it controls. Moreover, by transferring the selection conditions specified by the switch and using these conditions as information required for channel setup by another control station, communication can be carried out using a high-priority speech coding scheme when handover occurs. This happens when channel selection takes place in another radio zone spanning control stations, or when a mobile station has moved to a radio zone in which a high-priority speech coding scheme can be used. As a result, traffic channels based on the optimum speech coding scheme can be changed over smoothly.

11 Claims, 10 Drawing Sheets

MOBILE COMMUNICATION SYSTEM HAVING A CONTROL STATION WHICH SELECTS SPEECH CODING SCHEMES FOR A MOBILE STATION

This appln is a con't of International Appln No. PCT/JP96/00013 filed Jan. 9, 1996.

BACKGROUND OF THE INVENTION

1. Technical Field of the Invention

This invention can be utilized for a car phone or portable phone services, and for digital mobile communication systems. It can be utilized for mobile communication networks in which there are a plurality of speech coding schemes, and it relates in particular to the techniques employed by control stations for setting and controlling traffic channels (which may include wire links and radio channels).

2. Background of Related Art

VSELP (Vector Sum Excited Linear Prediction) as standardized in Personal Digital Cellular Telecommunication System RCR Standard 27 is an example of a speech coding scheme for use in the transmission of speech signals between mobile stations and switches. However, given that a plurality of speech coding schemes might be adopted in the future, it is possible that a single mobile communication system will have some mobile stations which can select a speech coding scheme from among a plurality of such schemes, and some which can only use a certain specific scheme. It is also possible that a single mobile communication system will have some base stations which can handle a plurality of speech coding schemes, and some which can only handle a certain specific scheme.

If a newly introduced speech coding scheme is superior to an existing scheme, it is desirable to adopt a policy of making preferential use of the new scheme. A prior art example of a mobile communication system will be explained with reference to FIG. 1, which shows the overall configuration of a digital mobile communication system which employs a plurality of speech coding schemes. Mobile station 11 is located in radio zone 1 of base station 21 which supports bit rate α corresponding to speech coding scheme A and bit rate β corresponding to speech coding scheme B, and base station 21 is served by switch 41. Mobile station 12 is located in radio zone 2 of base station 22 which supports bit rate β corresponding to speech coding scheme B, and base station 22 is served by switch 42. Switches 41 and 42 are in turn served by an upper node. It is assumed that mobile station 11 has codec a for speech coding scheme A and codec b for speech coding scheme B, and that mobile station 12 has only codec b for speech coding scheme B.

A conventional method for matching speech coding schemes is as follows (see Jap. Unexamined Pat. No. 6-6295). When mobile station 11 wants to communicate with mobile station 12, information relating to the speech coding schemes of mobile station 11 and mobile station 12 is acquired by switch 41 from database 51 in which subscriber-related information is stored. This is done on the basis of the subscriber number of called mobile station 12 and the calling subscriber number, which are contained in the SETUP request signal received from calling mobile station 11. In the present case, mobile stations 11 and 12 will then be notified of speech coding scheme B which can be set up at both these mobile stations, whereupon a speech channel is set up.

An alternative method for matching speech coding schemes is as follows (see Jap. Pat. Appl. No. 5-170383, laid open on Jan. 31, 1995 under No. 7-30947. Switch 41 sets up a traffic channel to calling mobile station 11 from which there was a SETUP request, this traffic channel being set up for use by speech coding scheme A having a high preassigned priority. Switch 42 is notified by switch 41 of this speech coding scheme A and attempts to set up a traffic channel to called mobile station 12 for use by this speech coding scheme A. However, if the setting up of a traffic channel to mobile station 12 results in speech coding scheme B, switch 41 on the originating side is notified of the fact that a traffic channel to mobile station 12 has been set up for use by speech coding scheme B, whereupon speech coding scheme A of mobile station 11 is changed to speech coding scheme B.

It has been assumed that the setting up a traffic channel in prior art speech coding negotiation schemes of these sorts is carried out between a switch and a mobile station via a base station. However, in a practical digital mobile communication system a control station is interposed between a switch and a base station, and this control station has the functions of controlling and selecting the traffic channels used by the base station. Setting up a traffic channel for a mobile station which makes a SETUP request is achieved by transferring the required setup information between the control station and the switch, and is begun when the switch notifies the control station that there is a traffic channel assign request. The control station then selects an assignable traffic channel and the switch activates the codec corresponding to the selected traffic channel, thereby setting up the channel. Because there are connection delay problems, the assignment of traffic channels between switches and control stations is carried out in a round trip of request and response.

It is assumed that when there are a plurality of speech coding schemes in a digital mobile communication system, traffic channels will be set in accordance with a prearranged order of priority of these speech coding schemes. However, as noted above, traffic channel selection is performed by a control station, and once a selection has been made it is impossible to change over to another traffic channel until the setting of the selected channel has been completed.

Consequently, each time a traffic channel for use by the speech coding scheme which a switch has instructed a control station to select is to be changed to a traffic channel for use by another speech coding scheme, the switch must re-instruct the control station to select another speech coding scheme, and the resulting delay is significant.

In other words, although the control station is notified of the result of the selection decided by the switch, it is not notified of the prearranged order of priority of the speech coding schemes and other selection conditions, and therefore the decision as regards which speech coding scheme to select cannot be made at the control station.

A mobile station uses a control channel to measure, during standby, the received signal level in the control channel of the radio zone in which it is located, and the received signal level in the control channels of a plurality of radio zones surrounding the radio zone in which it is located, the radio zones being specified from the control station by way of the control channel. Then, when it makes a SETUP request, the mobile station informs the control station of (a) the plurality of control channel numbers of the surrounding radio zones, and (b) the received signal levels of these control channels, this data being sent in pairs. A control station has a peripheral zone selection function which operates as follows. When the control station receives a SETUP request from a mobile station, it stores the plurality of pairs of control channel numbers and received signal levels that are contained within the SETUP request. Then, if it is been impossible for a traffic channel to be selected in the radio zone in which the mobile station is located, the control station deduces, from the stored received signal levels which exceed a preset threshold beyond which selection is possible, and their paired control channel numbers, which surrounding radio zones may serve as peripheral radio zone candidates. This deduction is based on the relation between the preassigned control channel numbers and the peripheral radio zones. The control station then ranks these in order of increasing received signal level and uses them as candidate radio zones. Finally, it assigns a candidate radio zone if it has a free traffic channel.

Accordingly, when, for example, a traffic channel for a mobile station cannot be selected within the radio zone which has received the SETUP request of the mobile station, and there is a peripheral radio zone in which a channel can be selected, and control station X which controls the peripheral radio zone in which channel selection is possible is different from control station Y which controls the radio zone in which the SETUP request of the mobile station is received, control station Y must ask control station X to select a traffic channel. Control station Y must then transfer to control station X the order of priority and other selection conditions relating to the speech coding schemes. A control station also has a handover function whereby the traffic channel in use is changed over to a better quality traffic channel when a lower quality of service obtained by an active mobile station is detected in the radio zone controlled by that control station, or when an active mobile station has moved to another radio zone. Under these circumstances as well, just as in the case of the peripheral zone selection function described above, transfer of selection conditions between control stations is required.

That is, a table which stores the order of priority and other selection conditions relating to the speech coding schemes has to be provided in the control stations, and the contents of this table have to be transferred between control stations. However, none of the mobile communication systems taught in the prior art include any proposals which take this sort of thing into consideration.

The setup of a traffic channel at the beginning of a call is carried out by a control station in accordance with an instruction from a switch, and involves the control station informing the switch of the results of this setup. When a control station receives a traffic channel setup instruction from a switch, it must temporarily store information relating to the selection conditions. Furthermore, with regards to implementing the peripheral zone selection function and the handover function, it is essential for the control stations to temporarily store the selection conditions involved and for this selection information to be transferred between control stations.

Thus, when a traffic channel is selected in an actual digital mobile communication system, a decision regarding which speech coding scheme to select, based on selection conditions, frequently has to be made not only at the switches but also at the control stations. Despite this, the transfer of order of priority and other selection conditions for speech coding schemes is not carried out between control stations in the prior art.

Furthermore, no concrete proposals have yet been made for an optimum way of utilizing speech coding schemes when connecting to another communication network. The other network to which a connection may be made from a mobile station may be the ordinary public switched telephone network or another mobile communication system. In the case of connection to the ordinary public switched telephone network, the speech signal is communicated after converting it from the speech coding scheme characteristic of the mobile communication system to, for example, 64 kbps. In the case of connection to another mobile communication system, sometimes the speech signal will be transmitted after converting it from the speech coding scheme characteristic of the mobile communication system to 64 kbps, and sometimes the connection will involve matching to the same speech coding scheme. Careful thought must therefore also be given to the best method for utilizing speech coding schemes when making multistage connections, as when a speech signal is transmitted after being converted to 64 kbps.

SUMMARY OF THE INVENTION

This invention has been devised in the light of this technical background. This invention's objects are to provide a mobile communication system wherein: it is possible to communicate on the basis of an optimum speech coding scheme which is matched to the speech coding schemes provided by the radio zones and the speech coding capability of the mobile stations; to provide a setup of traffic channels which can be carried out smoothly; and to provide an optimum speech coding scheme which can be selected on the basis of a control station decision. Within a given network, communication is possible on the basis of the optimum speech coding scheme provided by the radio zones and the optimum speech coding scheme matched to the speech coding capability of the mobile stations, irrespective of the nature of the connections between communication terminals.

According to a first aspect, this invention is a mobile communication system which includes: a multiplicity of mobile stations, a plurality of base stations connected to these mobile stations by radio channels, one or more switches which switch and connect transmission routes between two mobile stations respectively connected to two base stations, and control stations which set and control the connection conditions of the aforementioned base stations. Of the aforementioned multiplicity of mobile stations, some have equipment which can handle a single type of speech coding scheme, and some have equipment which can adaptively handle two or more different types of speech coding schemes.

One feature of this invention is that the control stations have: a table which temporarily stores, over the interval from connection until release, conditions relating to the speech coding schemes of two connected mobile stations; a means which selects the type of speech coding scheme on the basis of the content stored in this table; and a means which, when at least one of the two mobile stations has been connected to other base station, transfers the aforementioned connection conditions to the control station pertaining to the aforementioned other base station.

This makes it possible to communicate on the basis of an optimum speech coding scheme that is matched to the speech coding schemes provided by the radio zones, and to the speech coding capability of the mobile stations. It also facilitates the smooth setup of traffic channels.

Of the aforementioned plurality of base stations, some may have equipment capable of handling a single type of speech coding scheme, and some may have equipment capable of adaptively handling two or more different types of speech coding schemes.

It is desirable for an order of priority to be set in advance for the speech coding schemes which this latter equipment can use. It is then desirable for the speech coding scheme in use to be changed in accordance with this order of priority when an aforementioned mobile station fitted with equipment capable of adaptively handling two or more different types of speech coding scheme has moved, during a call, from the radio zone of a base station fitted with equipment capable of handling a single type of speech coding scheme, to the radio zone of a base station fitted with equipment capable of adaptively handling two or more different types of speech coding schemes.

Alternatively, when an aforementioned mobile station fitted with equipment capable of adaptively handling two or more different types of speech coding schemes accesses the control channel of a base station fitted with equipment capable of handling a single type of speech coding scheme, and communicates by means of a traffic channel of a base station fitted with equipment capable of adaptively handling two or more different types of speech coding scheme, it is desirable for the speech coding scheme that is used to be set in accordance with the aforementioned order of priority.

This enables a mobile station which is capable of using a preferred speech coding scheme to change, if conditions are suitable, to this preferred speech coding scheme even during a call for which another speech coding scheme is being used.

The present invention may include a database in which is recorded which of the multiplicity of mobile stations can handle which speech coding schemes. An aforementioned switch may include a means which refers to this database when a connection is to be established, and a means which transfers information recorded in this database to an aforementioned control station. The aforementioned control stations may have a means which records the transferred information in the aforementioned table.

An aforementioned switch may include a means which, when a connection is to be established, finds out which speech coding schemes the two mobile stations to be connected can handle. This is done via the channel used for the connection control, and by means of information from these mobile stations.

This enables an optimum speech coding scheme to be selected by means of a decision by a control station.

According to a second aspect, this invention is a mobile communication system which includes: a multiplicity of mobile stations; one or more than one base station connected to these mobile stations by radio channels; one or more than one switch which, for a mobile station connected to a base station, connects a transmission route to a called party belonging to an upper node; and control stations which set and control the connection conditions of the aforementioned base stations. Of the aforementioned multiplicity of mobile stations, some have equipment which can handle a single type of speech coding scheme, and some have equipment which can adaptively handle two or more different types of speech coding schemes.

One feature of this invention is that the aforementioned control stations include: a table which temporarily stores, over the time interval from connection until release, conditions relating to the speech coding schemes of two connected mobile stations; a means which selects the type of speech coding scheme on the basis of the content stored in this table; and a means which, when at least one of the aforementioned two mobile stations has been connected to another base station, transfers the aforementioned connection conditions to the control station pertaining to the aforementioned other base station.

This enables an optimum speech coding scheme to be selected when communicating with a called party belonging to an upper node.

According to a third aspect, this present invention is a mobile communication system which includes: a multiplicity of mobile stations; one or more base station connected to these mobile stations by radio channels; one or more switch which, for a mobile station connected to the or a base station, connects a transmission route to a called party belonging to another communication network connected to an upper node; and control stations which set and control the connection conditions of the aforementioned base stations. Of the aforementioned multiplicity of mobile stations, some have equipment which can handle a single type of speech coding scheme, and some have equipment which can adaptively handle two or more different types of speech coding schemes.

One feature of this invention is that the aforementioned upper node has a means which converts the aforementioned speech coding schemes to the speech coding scheme which is applied to the aforementioned other communication network. The aforementioned control stations have: a table which temporarily stores, over the time interval from connection until release, conditions relating to the speech coding schemes of two connected mobile stations; a means which selects the type of speech coding scheme on the basis of the content stored in this table; and a means which, when at least one of the aforementioned two mobile stations has been connected to another base station, transfers the aforementioned connection conditions to the control station pertaining to the aforementioned other base station.

This enables an optimum speech coding scheme to be selected when communicating with a called party belonging to another communication network connected to an upper node.

In a control station, selection conditions relating to the speech coding schemes of two connected mobile stations are temporarily stored over the time interval from connection until release. The type of speech coding scheme is selected on the basis of this stored content.

In other words, when a traffic channel is set up between a mobile station and a switch, the traffic channel selection condition specified by the switch on the basis of the speech coding capabilities of the mobile station that made the SETUP request and the mobile station to which the connection is made, is stored in the control station, which grasps which speech coding scheme is currently being used in the radio zone which it controls. When radio zones are changed over during a call, an optimum speech coding scheme can be selected by mutually transferring selection conditions between the control stations that control the radio zones involved.

Of the plurality of mobile stations and base stations, some have equipment which can handle a single type of speech coding scheme, and some have equipment which can adaptively handle two or more different types of speech coding scheme. An order of priority is set in advance for the speech coding schemes which this latter equipment can use.

It is also possible for the speech coding scheme in use to be changed in accordance with the aforementioned order of priority when this mobile station fitted with equipment capable of adaptively handling two or more different types of speech coding schemes has moved, during a call, from the radio zone of a base station fitted with equipment capable of handling a single type of speech coding scheme, to the radio zone of a base station fitted with equipment capable of adaptively handling two or more different types of speech coding scheme.

Alternatively, when this mobile station fitted with equipment capable of adaptively handling two or more different types of speech coding scheme accesses the control channel of a base station fitted with equipment capable of handling a single type of speech coding scheme, and communicates by means of a traffic channel of a base station fitted with equipment capable of adaptively handling two or more different types of speech coding schemes, the speech coding scheme that is used can be set in accordance with the aforementioned order of priority.

The present invention may include a database in which is recorded which of the multiplicity of mobile stations can handle which speech coding schemes. When a connection is to be established, the switch can refer to this database and retrieve the selection condition for the optimum speech coding scheme.

Even when a database is not used, when a connection is to be established the switch can still find out which speech coding schemes the two mobile stations to be connected can handle. This is done via the channel used for the connection control, and by means of information from these mobile stations.

Thus, by transferring the selection conditions that have been specified by a switch, and using these conditions as information required for channel setup by another control station, communication can be carried out using a high-priority speech coding scheme when handover occurs as the result of the transfer of stored selection conditions. Such transfer occurs when a channel is selected in another radio zone spanning control stations, or when a mobile station has moved to a radio zone in which a high-priority speech coding scheme can be used.

The foregoing is likewise applicable to the case where the party called by a mobile station is a terminal belonging to another communication network connected via an upper node.

In such a case, because the mobile station is connected to another communication network which converts to 64 kbps, for example, it is not necessary to match speech coding schemes, and the mobile station of the originating network can select a speech coding scheme in accordance with the order of priority, irrespective of the speech coding scheme of the terminal of the aforementioned other network. When a mobile station of the originating network, mobile station being fitted with equipment which can adaptively handle two or more different types of speech coding schemes, has moved, during a call to a terminal of the aforementioned other network, from a radio zone of a base station fitted with equipment capable of handling a single type of speech coding scheme, to a radio zone of a base station fitted with equipment capable of adaptively handling two or more different types of speech coding scheme, the mobile station of the originating network can change the speech coding scheme which it uses, in accordance with the aforementioned order of priority, irrespective of the speech coding scheme being used by the terminal belonging to the other network.

These methods ensure that within its own network, a mobile station can always communicate using an optimum speech coding scheme, irrespective of the nature of the connection between terminals, i.e., irrespective of whether it is a connection within a mobile communication system or between a mobile communication system and another communication network.

As has been explained above, this invention makes it possible to select an optimum speech coding scheme on the basis of a control station decision. This makes it possible to set up traffic channels smoothly, and for communication to be carried out using an optimum speech coding scheme that is matched to the speech coding schemes provided by the radio zones and the speech coding capability of the mobile stations.

OPTIMUM CONFIGURATION FOR EMBODYING THE INVENTION

Figure 1:
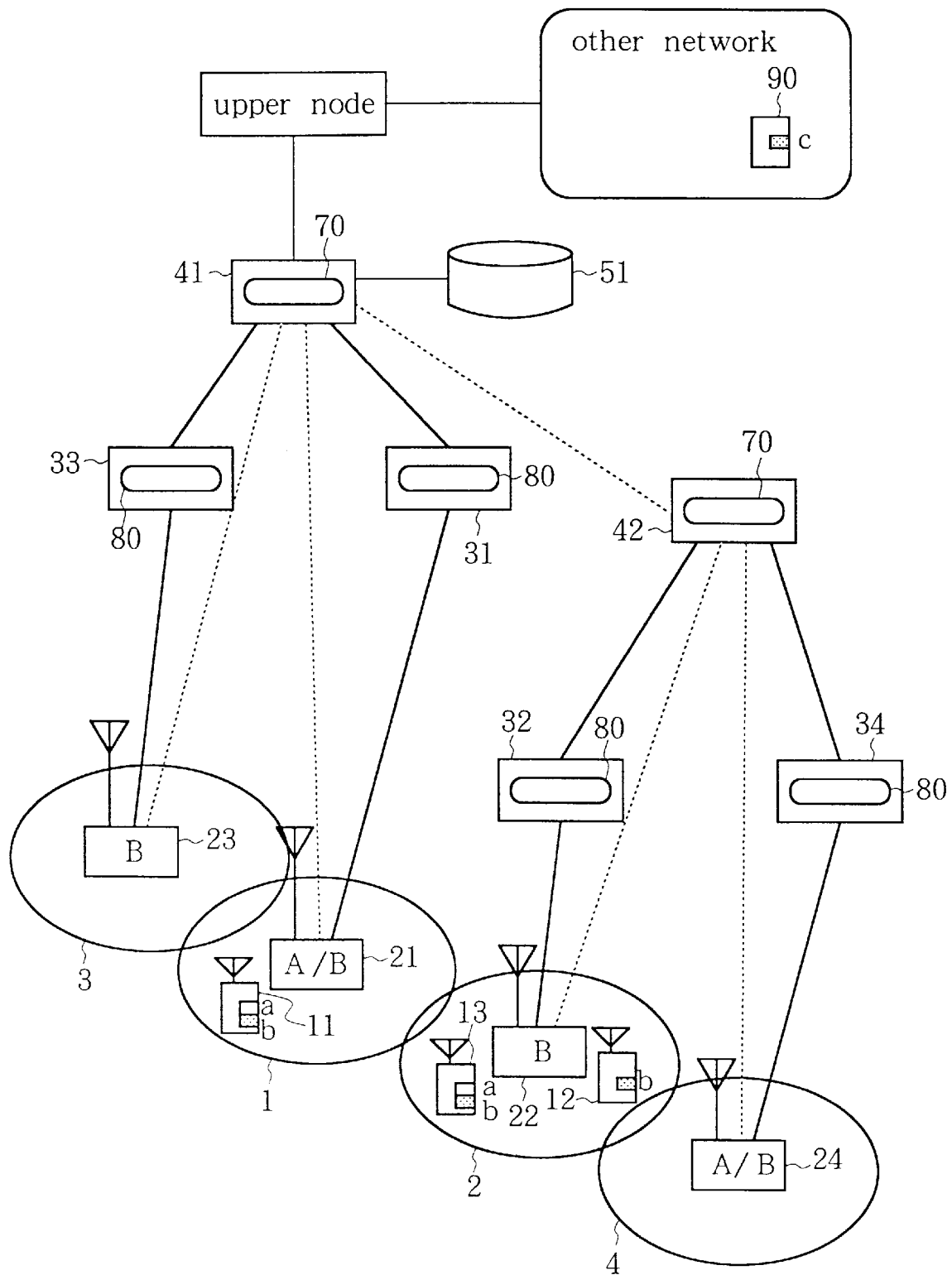
FIG. 1 shows the overall configuration of a mobile communication system.

The configuration of an embodiment of this invention will be explained with reference to FIG. 1 and FIG. 2. FIG. 1 shows the overall configuration of a mobile communication system, while FIG. 2 is a block diagram of a control station according to an embodiment of this invention.

This invention is the mobile communication system shown in FIG. 1. In other words, it is a mobile communication system which has: mobile stations 11–13; base stations 21–24 connected to these mobile stations 11–13 by radio channels; switches 41 and 42 which switch and connect transmission routes between two of mobile stations 11–13 which are respectively connected to two of base stations 21–24; and control stations 31–34 which set and control the connection conditions of base stations 21–24. Some of mobile stations 11–13 have equipment which can handle one type of speech coding scheme A or B, and some have equipment which can adaptively handle different types of speech coding scheme A and B.

Figure 2:
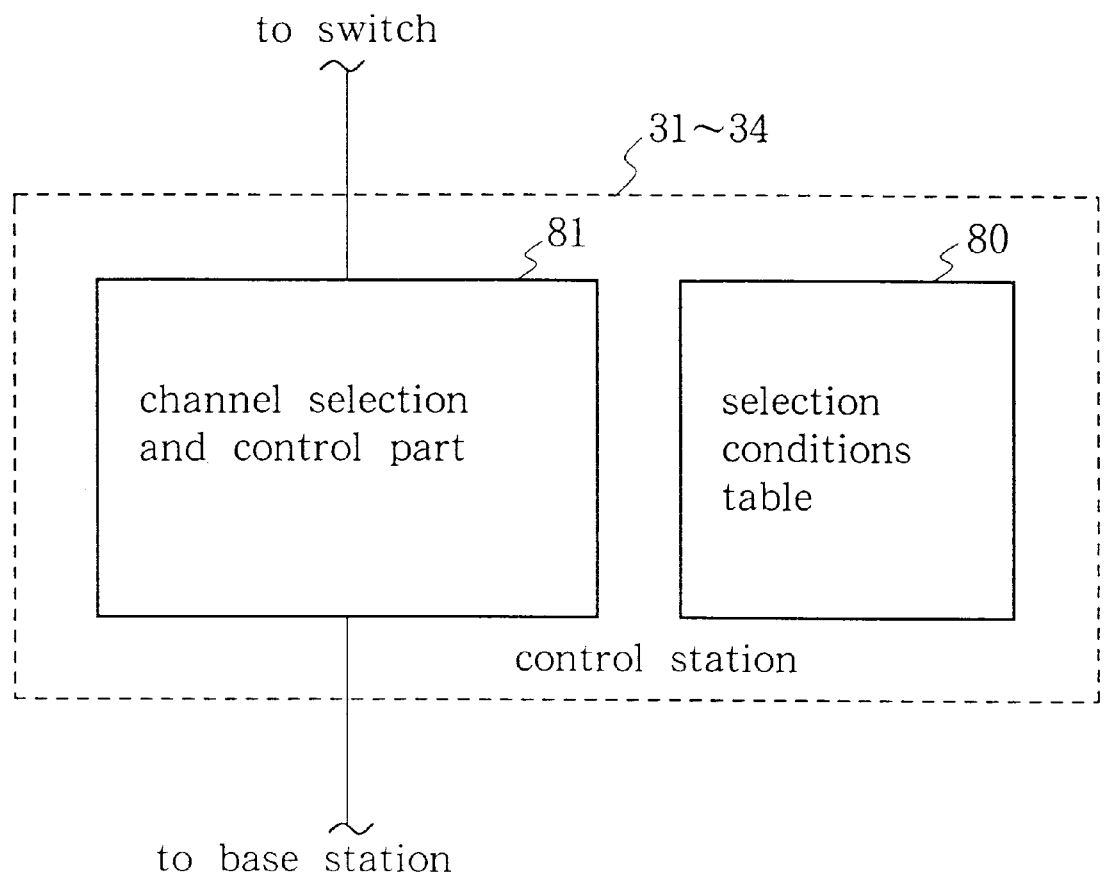
FIG. 2 is a block diagram of a control station according to an embodiment of this invention.

One feature of this invention is that control stations 31–34 have: selection conditions table 80 shown in FIG. 2 which temporarily stores, over the interval from connection until release, conditions relating to speech coding schemes A and/or B of two of connected mobile stations 11–13; and channel selection and control part 81 which serves as a means for selecting the type of speech coding scheme on the basis of the content stored in this selection conditions table 80. The part 81 also serves as a means which, when at least one of two active mobile stations among mobile stations 11–13 has moved to a radio zone 1–4 of another base station 21–24, transfers the aforementioned connection conditions to a control station 31–34 pertaining to the aforementioned other base station 21–24.

Some of base stations 21–24 have equipment which can handle one type of speech coding scheme A or B, and some have equipment which can adaptively handle different types of speech coding schemes A and B.

An order of priority is set in advance for the speech coding schemes A and B which this latter equipment can use.

When mobile station 13, which is fitted with equipment capable of adaptively handling different types of speech coding scheme A and B, has moved during a call, from radio zone 2 of base station 22 which is fitted with equipment capable of handling a single type of speech coding scheme B, to radio zone 4 of base station 24 which is fitted with equipment capable of adaptively handling different types of speech coding scheme A and B, the speech coding scheme it uses is changed from B to A in accordance with the aforementioned order of priority.

Database 51 is also provided, and in this database is recorded which of speech coding schemes A or B mobile stations 11–13 can handle. Switches 41 and 42 include, in switch control part 70, a means which refers to this database 51 when a connection is to be established, and a means which transfers information from this database 51 to control stations 31–34.

Switches 41 and 42 can also be constituted so as to include, in switch control part 70, a means which, when a connection is to be established, finds out which of speech coding schemes A or B the two of mobile stations 11–13 to be connected can handle. This is done via the channels used for the connection control, and by means of information from these mobile stations 11–13.

Figure 3:
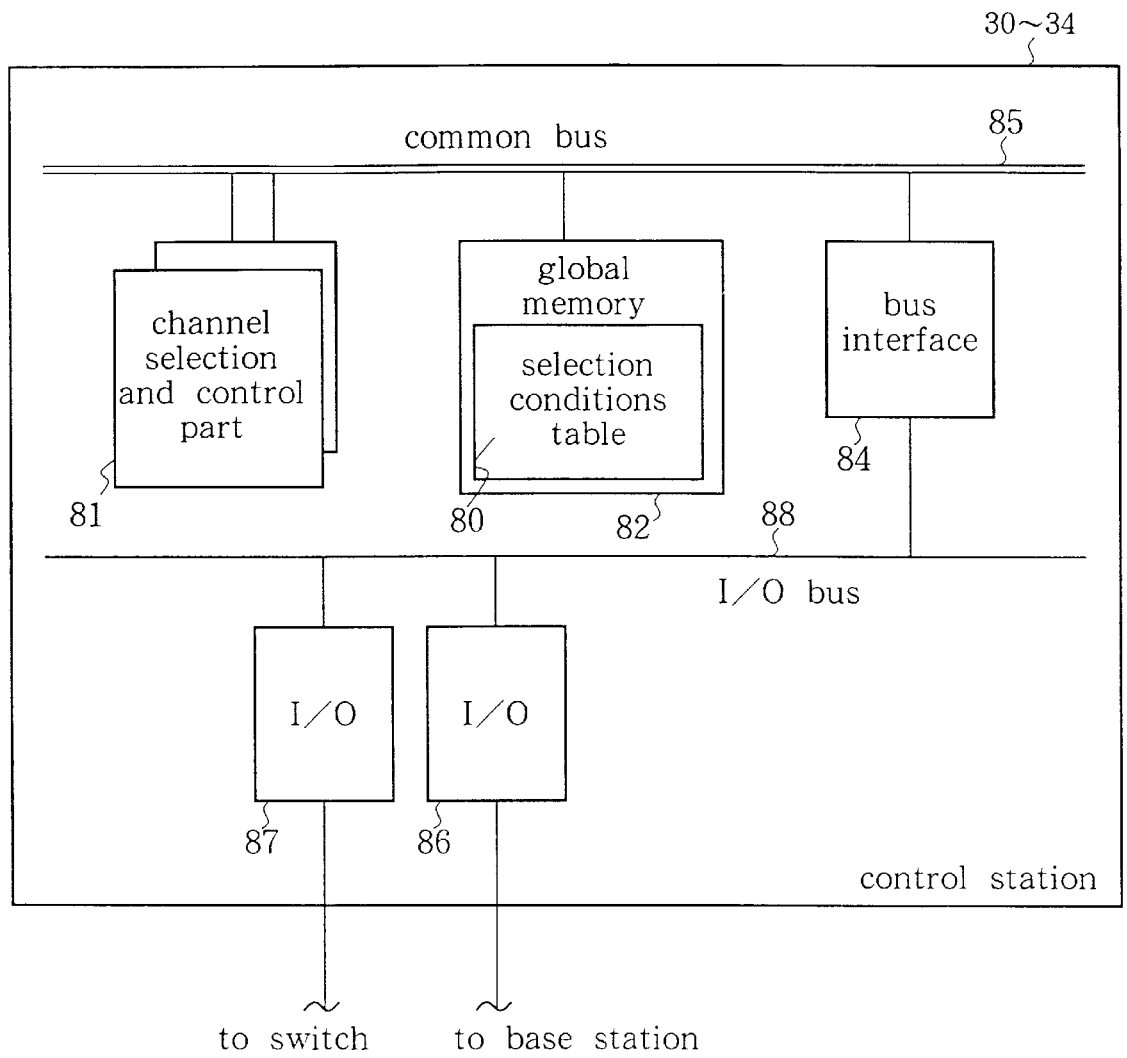
FIG. 3 is a detailed block diagram of a control station according to an embodiment of this invention.

The configuration of control stations 31–34 is shown in greater detail in FIG. 3, which is a detailed block diagram of control stations 31–34 according to an embodiment of this invention. Channel selection and control part 81 mentioned above comprises a plurality of main CPUs. Global memory 82 is designed to be shared by the plurality of CPUs, and selection conditions table 80 is stored within global memory 82. Bus-interface 84 arbitrates the signal interrupts on I/O bus 88. Each of these devices is connected to common bus 85. I/O 86 and I/O 87 are connected to I/O bus 88, with I/O 87 serving to transmit control signals to an opposing switch, and I/O 86 serving to transmit control signals to an opposing base station.

Figure 4:
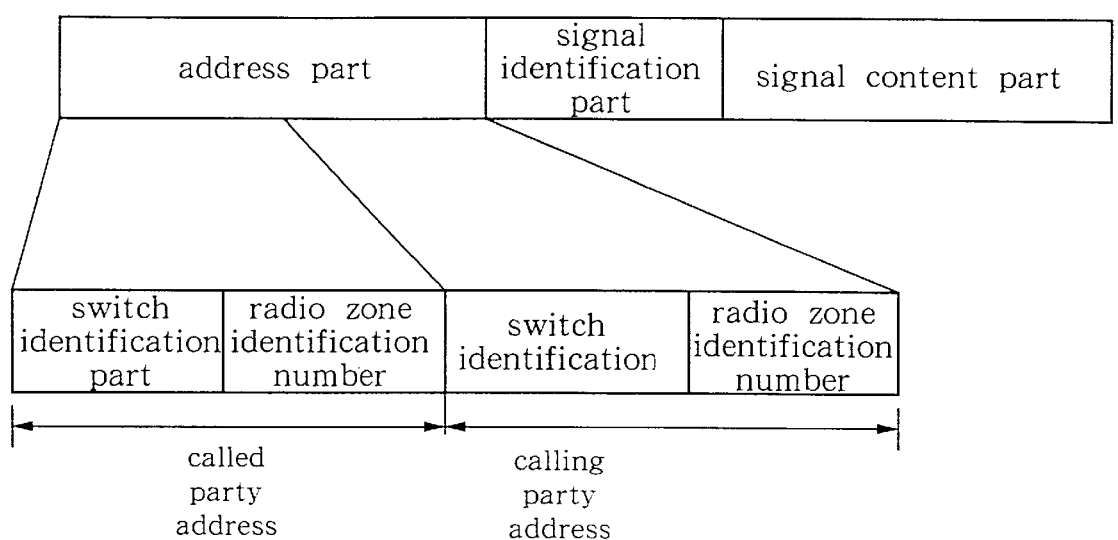
FIG. 4 shows the configuration of signals sent and received over fixed lines.

The configuration of the signals sent and received on the fixed lines between control station 31–34 and switches 41–42, and on the fixed lines between control stations 31–34 and base stations 21–24, is shown in FIG. 4. Starting from the front, the signal is divided into an address part which shows where to send the signal, a signal identification part for identifying the signal, and a signal content part. The address part is divided into the called party address and the calling party address. The address part specifies the equipment or control units which terminate the sending and receiving of the signal. The equipment and control units have to be specifiable within the mobile communication system which sends and receives the signals. Because current mobile communication systems adopt a number system which puts radio zone identification numbers inside each switch, the address part consists of the identification number of a switch, which is the highest level station, plus the identification number of a radio zone, which is the lowest level control unit. When the called party address comprises a radio zone signal, it is received by the control station which controls the radio zone in question, and the necessary control is performed.

Next, the operation of an embodiment of this invention will be explained with reference to sequence diagrams FIG. 5–FIG. 9. It will be assumed here that an existing speech coding scheme B and a new speech coding scheme A are both used. Speech coding scheme A has a performance advantage over speech coding scheme B, and although the intention is to standardize on speech coding scheme A in the future, the present mixed use situation is a transitional period towards this standarization. It is therefore desirable to set up channels for use by speech coding scheme A when mobile stations 11 or 13, which are capable of using speech coding scheme A, are located in radio zones 1 or 4 of base stations 21 or 24, which are capable of using coding scheme A.

First, the following example will be explained with reference to FIG. 5: namely, the case where mobile station 11 which can use either of speech coding schemes A or B, calls mobile station 12 which can only use speech coding scheme B. Here, mobile station 11 has both codec a for speech coding scheme A and codec b for speech coding scheme B, while mobile station 12 has only codec b for speech coding scheme B.

Mobile station 11 sends a SETUP request to switch 41 via base station 21 and control station 31 (S1). Switch 41 accesses database 51 (S2). As a result of this, it is learnt that mobile station 11 can use either speech coding scheme A or B, and that mobile station 12 can use only speech coding scheme B (S3). In order to assign speech coding scheme B which can be used by both mobile stations 11 and 12, the selection condition that selection is restricted to speech coding scheme B is transferred to control station 31 along with a channel assign request (S4), whereupon control station 31 stores the transferred selection condition in its own selection conditions table 80 (S5) and, in accordance with the selection condition, selects a traffic channel of bit rate β corresponding to speech coding scheme B and notifies switch 41 of the selected channel (S6). Switch 41 notifies control station 31 that it should make base station 21 and mobile station 11 start up using speech coding scheme B (S7), and at the same time sets up a traffic channel to switch 42 (S8). Switch 42, which has been notified by switch 41 of the SETUP request and of the fact that it is using speech coding scheme B, pages mobile station 12 (S9) and after the response, transfer to control station 32 the channel assign request, using the selection condition that selection is restricted to speech coding scheme B (S10). Control station 32 stores the selection condition in its selection conditions table 80 (S11), selects a traffic channel of bit rate β corresponding to speech coding scheme B, and notifies switch 42 of this (S12). In similar manner to the originating side, switch 42 sets up the traffic channel (S13), whereupon the call can proceed using speech coding scheme B (S14).

Figure 5:
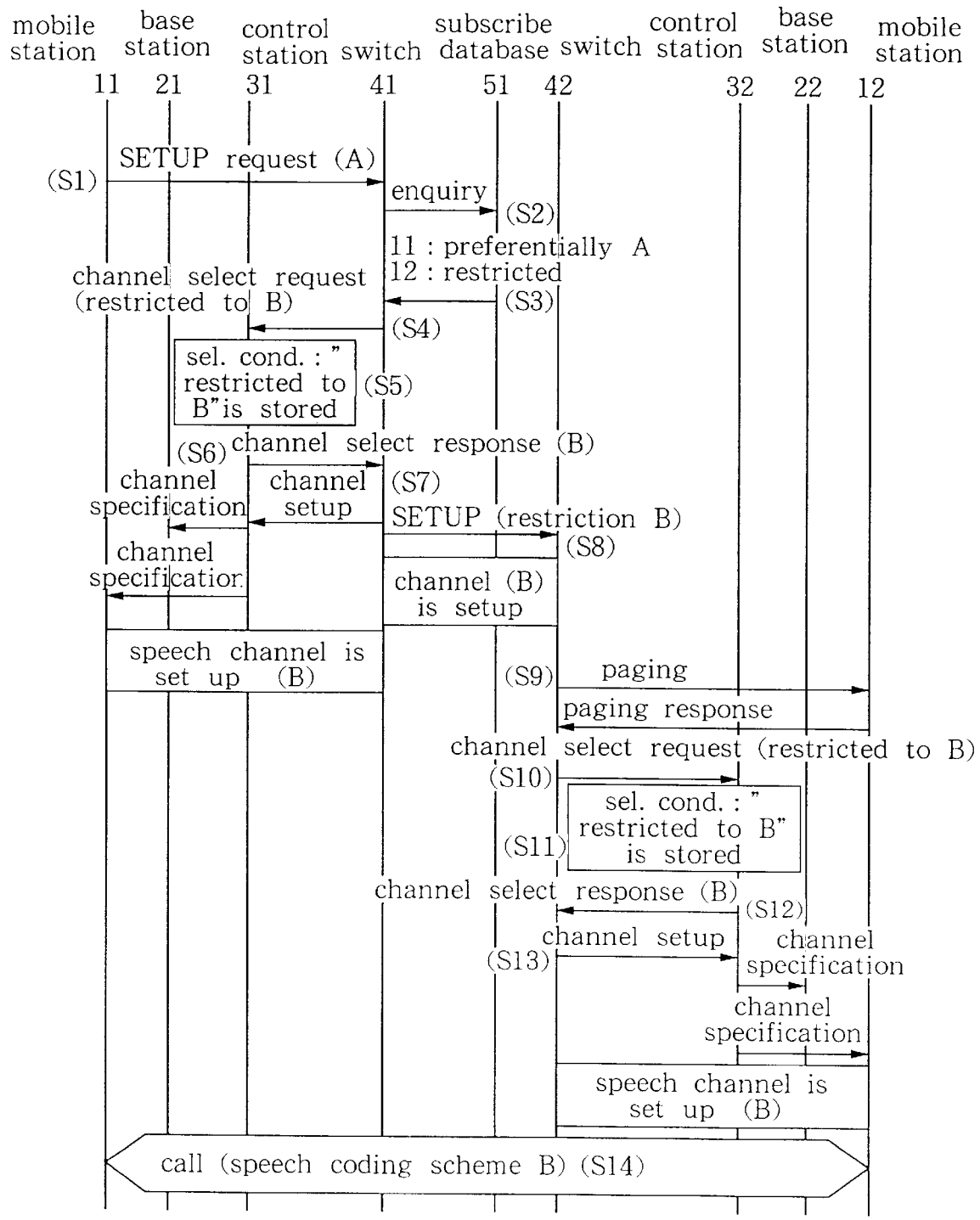
FIG. 5 is a sequence diagram serving to explain the operation of an embodiment of this invention.

In FIG. 5, because called mobile station 12 can only be called using speech coding scheme B, until this channel connection is terminated it is impossible for mobile stations 11 and 12 to communicate using speech coding scheme A. Consequently, a traffic channel that uses bit rate β corresponding to speech coding scheme B has to be selected regardless of whether a handover has occurred at mobile station 11 or 12, and therefore the selection condition at both control stations 31 and 32 is that selection is restricted to coding scheme B.

The traffic channel selection request signal (restrict to B) sent from switch 41 to control station 31 will now be examined in greater detail with reference to the fixed line signal configuration shown in FIG. 4. In the called party address of this signal there is inserted a number which identifies switch 41 and the identification number of radio zone 1, while in the calling party address there is inserted only the number that identifies switch 41. In the signal identification part there is inserted a signal identification number which indicates a channel selection request; and in the signal content part various information is inserted, including that a restriction to B has been set in the channel selection request.

Figure 6:
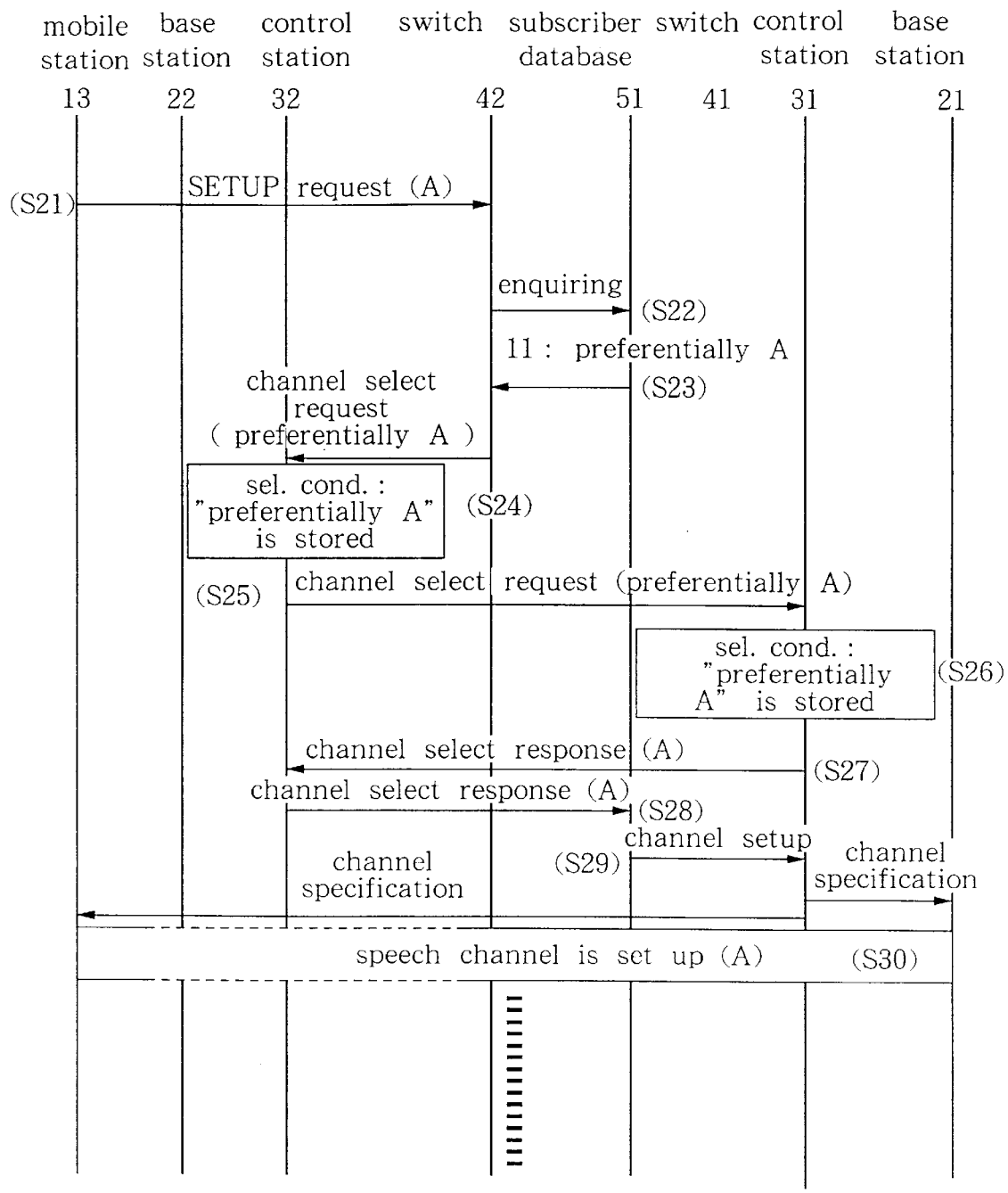
FIG. 6 is a sequence diagram serving to explain the operation of an embodiment of this invention.

Next, the processing sequence when a traffic channel to mobile station 13 is selected and set up from another radio zone will be explained with reference to FIG. 6. A SETUP request from mobile station 13 arrives at switch 42 via base station 22 and control station 32 (S21).

Switch 42 first of all sends an enquiry to subscriber database 51 (S22) and obtains the following selection condition: namely, although mobile station 13 is capable of using either speech coding scheme A or B, speech coding scheme A has priority (S23). This selection condition is transferred as a traffic channel selection request to control station 32 from switch 42 and is stored in selection conditions table 80 of control station 32 (S24). If for any reason, e.g., the lack of a free channel in base station 22, the SETUP request is not received from mobile station 13, control station 32 tries to receive it at base station 21 of adjacent radio zone 1, as explained previously in connection with the prior art.

Control station 32 transfers the request for channel selection on the basis of speech coding scheme A to control station 31 of base station 21 (S25). Control station 31 stores the selection condition of mobile station 13 in selection conditions table 80 (S26). Because base station 21 can handle speech coding schemes A and B, control station 31 informs control station 32 of the channel selection on the basis of speech coding scheme A as a traffic channel selection response (S27). Control station 32 understands this and sends the traffic channel selection response to switch 41 via switch 42 (S28). Switch 41 instructs control station 31 to establish a radio channel between base station 21 and mobile station 13 (S29). A speech channel based on speech coding scheme A is then set up between mobile station 13, base station 21, control station 31 and switch 41 (S30). If there had been a free channel in base station 22, then although mobile station 13 is capable of using either speech coding scheme A or B, base station 22 can only handle speech coding scheme B, and therefore mobile station 13 would have ended up communicating using speech coding scheme B.

Thus, when it has been impossible to select a traffic channel in radio zone 2 in which a SETUP request is received, control station 32 transfers the selection condition specified by switch 42 (namely, that speech coding scheme A has priority) to control station 31 which controls radio zone 1, this transfer being made via switches 42 and 41. This transfer is made in order to select a traffic channel in peripheral radio zone 1. As a result, a traffic channel satisfying the selection condition specified by switch 42 can be selected even when the selection is made in another radio zone. This enables the invention to perform the peripheral zone selection function explained previously.

Signals between control stations will now explained with reference to the fixed line signal configuration shown in FIG. 4, taking as an example the signal requesting channel selection (with priority given to speech coding scheme A) transferred from control station 32 to control station 31. In the called party address of this signal there is inserted the identification number of switch 41 and the identification number of radio zone 1, while in the calling party address there is inserted the identification number of switch 42 and the identification number of radio zone 2. In the signal identification part there is inserted an identification number which indicates a channel selection request (priority A); and in the signal content part various information is inserted, including the fact that A has priority. This sort of transfer of a signal between control stations via a plurality of switches is possible because the switches decide the called party address, and the signal is relayed to the control station which controls the radio zone specified in that called party address, in accordance with the identification number of that radio zone.

Figure 7:
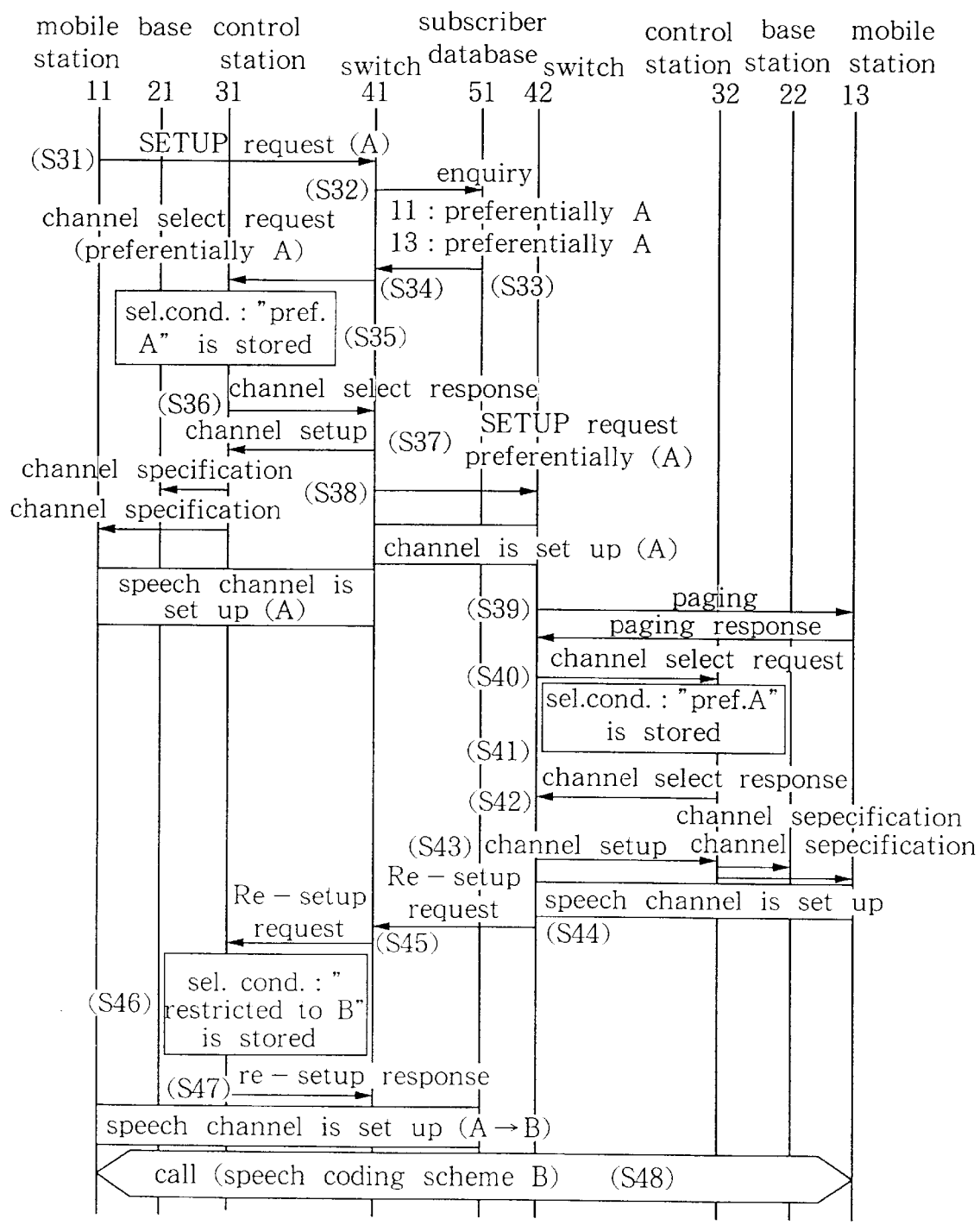
FIG. 7 is a sequence diagram serving to explain the operation of an embodiment of this invention.

Next, the processing sequence when mobile station 11 which is capable of using either speech coding scheme A or B, calls mobile station 13 which is also capable of using either speech coding scheme A or B, will be explained with reference to FIG. 7. Here, mobile station 13 has codec a for speech coding scheme A and codec b for speech coding scheme B. Mobile station 11 sends a SETUP request to switch 41 via control station 31 (S31), and switch 41 accesses database 51 (S32), thereby learning that both mobile stations 11 and 13 are capable of using speech coding scheme A or B (S33). Then, in accordance with the order of priority, switch 41 transfers to control station 31, as a channel assign request, the selection condition that speech coding scheme A should be preferentially selected, and that if this is impossible speech coding scheme B should be selected (S34). Control station 31 stores the transferred selection condition in its selection conditions table 80 (S35) and in accordance with the selection condition selects, for example, a traffic channel of bit rate α corresponding to speech coding scheme A and informs switch 41 of this (S36). Switch 41 notifies control station 31 that base station 21 and mobile station 11 should be started using speech coding scheme A (S37), and at the same time sets up a traffic channel to switch 42 (S38). After the channel setup, switch 42, which has been notified by switch 41 of the SETUP request and of the fact that speech coding scheme A or B can be used, pages mobile station 13 (S39), and after the response notifies control station 32 of a channel assign request with the selection condition that speech coding scheme A should be preferentially selected, and that if this is not possible, speech coding scheme B should be selected (S40). Control station 32 stores the selection condition in its selection conditions table 80 (S41), and attempts to select a traffic channel using this condition. However, because it only handles base station 22 which can only support speech coding scheme B, it selects a traffic channel of bit rate β corresponding to speech coding scheme B and notifies switch 42 of this (S42). Switch 42 then sets up a speech channel in similar manner to the originating side (S43). Once channel setup based on speech coding scheme B has been completed, switch 42 tells switch 41 to request a traffic channel re-setup for speech coding scheme B (S44). When switch 41 has received this request, it asks control station 31 to re-setup the traffic channel using the selection condition that channel setup is to be restricted to speech coding scheme B (S45). After control station 31 has received the re-setup request, it re-stores the selection condition that channel setup be restricted to speech coding scheme B in its selection conditions table 80 (S46). Control station 31 then selects a channel under this restriction, selecting a traffic channel of bit rate β corresponding to speech coding scheme B, and notifies switch 41 of this as a channel re-setup response (S47). By thus re-setting the traffic channel between switch 41 and mobile station 11, a connection is established on the basis of speech coding scheme B (S48).

Figure 8:
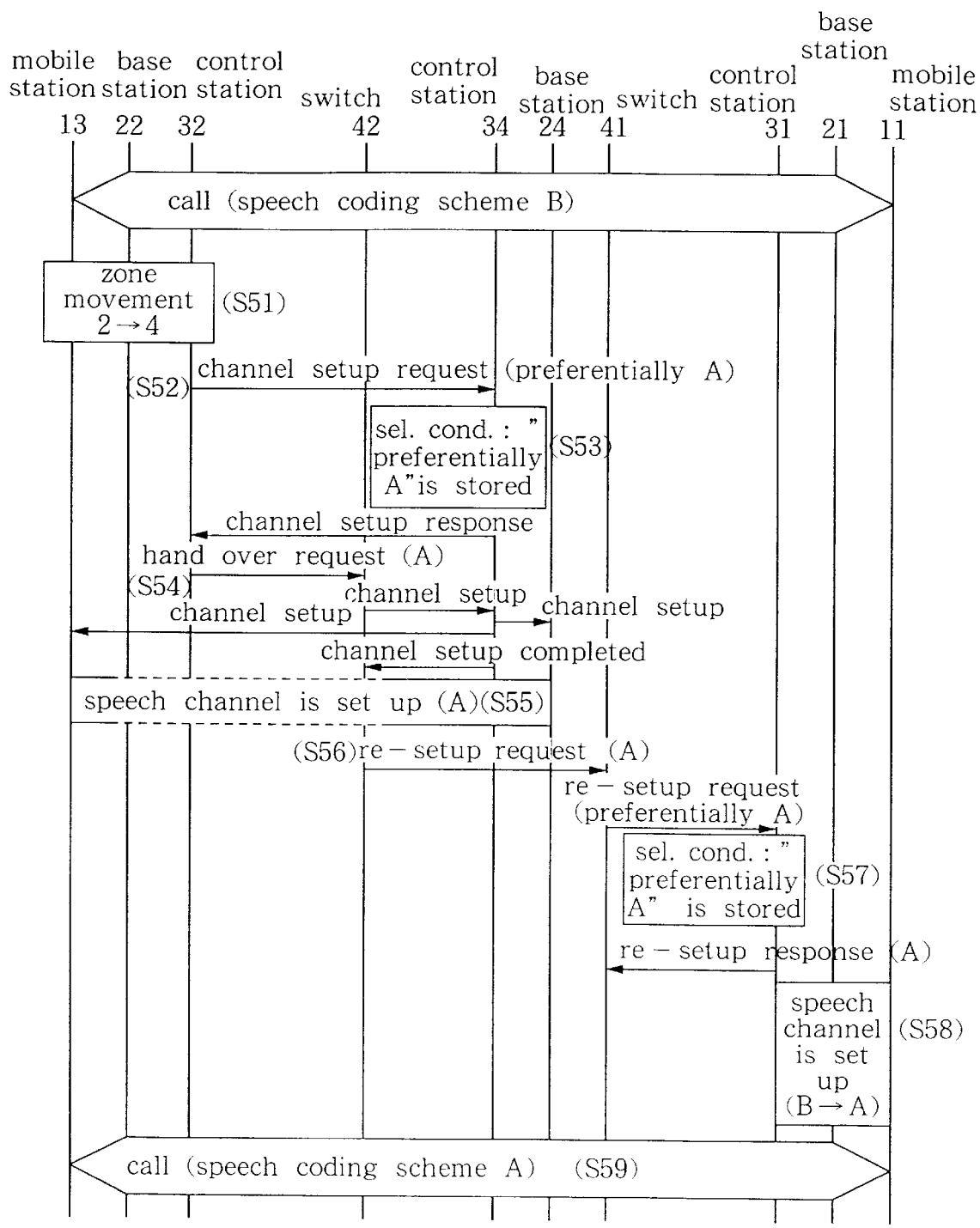
FIG. 8 is a sequence diagram serving to explain the operation of an embodiment of this invention.

FIG. 8 shows the situation where, after a connection has been established on the basis of speech coding scheme B, mobile station 13 moves to a radio zone in which communication using speech coding scheme A is possible. When mobile station 13 has moved to radio zone 4 in which communication using speech coding scheme A is possible (S51), control station 32, which controls radio zone 2 in which mobile station 13 was originally located, transfers to control station 34, which controls radio zone 4, the following traffic channel selection condition which was stored in its selection conditions table 80 (S52). Namely, speech coding scheme A should be preferentially selected for mobile station 13, and if this is not possible speech coding scheme B should be selected. Control station 34 stores this selection condition in its selection conditions table 80 (S53). In this way, control station 32 selects speech coding scheme A and asks switch 42 to change the traffic channel while the call is in progress (S54). A traffic channel is then set up between mobile station 13 and switch 42 on the basis of speech coding scheme A (S55). Switch 42 then requests switch 41 to re-setup the traffic channel to mobile station 11 on the basis of speech coding scheme A (S56). After control station 31 has received the channel re-setup request from switch 41, it updates the selection condition stored in its selection conditions table 80 (namely, that selection is restricted to speech coding scheme B) to the selection condition that speech coding scheme A has priority (S57), whereupon it selects bit rate α corresponding to speech coding scheme A (S58). A connection can therefore be established on the basis of speech coding scheme A by setting a traffic channel (S59). Mobile station 13 can therefore use speech coding scheme A, which should be preferentially selected, when it moves to radio zone 4 which supports this speech coding scheme A.

Figure 9:
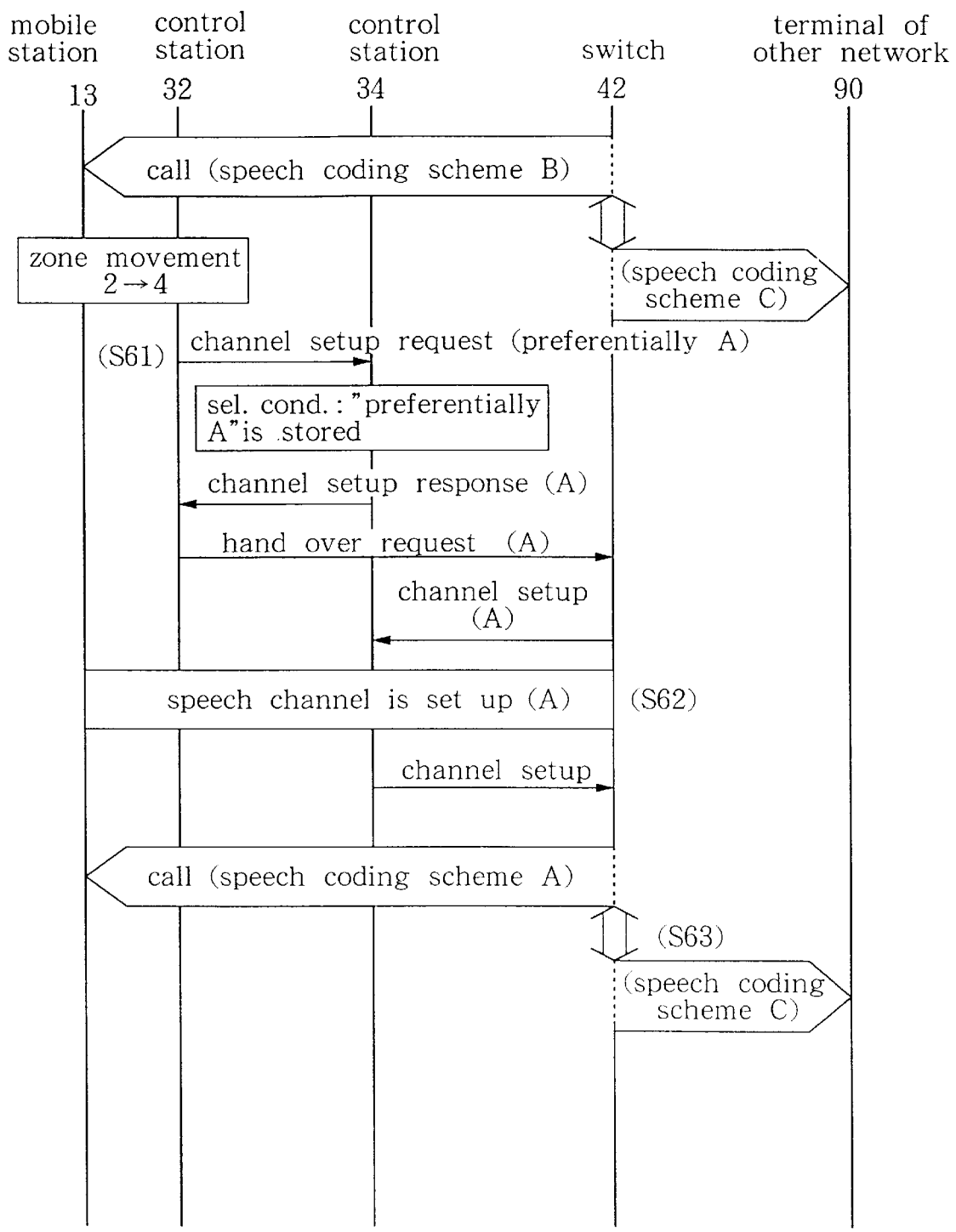
FIG. 9 is a sequence diagram serving to explain the operation of an embodiment of this invention.

Next, an explanation will be given, with reference to FIG. 9, of the processing sequence when mobile station 13, which is capable of using either speech coding scheme A or B, has moved from radio zone 2 which can handle speech coding scheme B only, to radio zone 4 in which communication is possible using speech coding scheme A or B, this movement being made during a call to communication terminal 90 which belongs to another communication network capable of handling speech coding scheme C only, this speech coding scheme being different from the speech coding schemes of the communication network to which mobile station 13 belongs. This case is similar to the case explained with reference to FIG. 8, where a mobile station moved from one radio zone to another during a call between mobile stations in the same communication network. Namely, control station 34, which controls radio zone 4 which is the destination of the move, receives from control station 32, which controls radio zone 2 in which mobile station 13 is originally located, the selection condition that speech coding scheme A is to be preferentially selected (S61). Control station 34 then selects speech coding scheme A, or failing this, selects speech coding scheme B. In the case illustrated in FIG. 9, it has been possible to set up a speech channel on the basis of speech coding scheme A in accordance with the channel handover procedure (S62). Because speech coding scheme C used by the other communication network is different from both speech coding scheme A and B, which can be handled by the communication network to which mobile station 13 belongs, there is a conversion to 64 kbps (S63). Consequently, because it is not necessary to match the same speech coding scheme, a mobile station in the first communication network can always make a call using high-priority speech coding scheme A which a radio zone provides.

Figure 10:
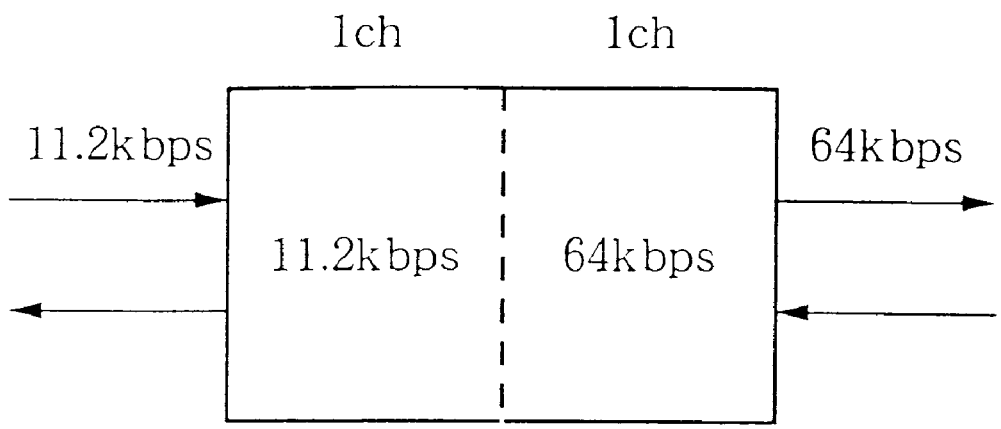
FIG. 10 is a conceptual diagram of a conversion circuit.
Figure 11:
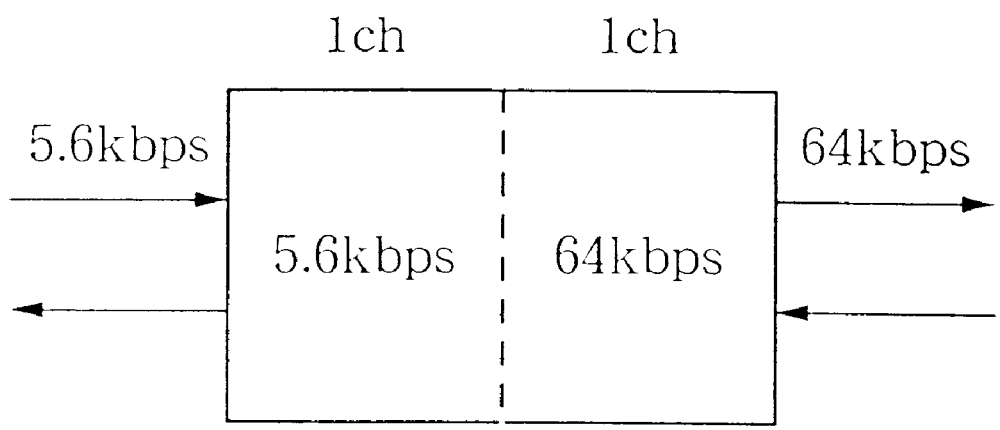
FIG. 11 is a conceptual diagram of a conversion circuit.

A specific example of converting speech coding scheme A or B to speech coding scheme C will be explained with reference to FIG. 10 and FIG. 11, which are conceptual diagrams of conversion circuits. In an embodiment of this invention, speech coding scheme A gives 11.2 kbps signals, while speech coding scheme B gives 5.6 kbps signals. Conversion circuits which convert these to the 64 kbps signals of speech coding scheme C are provided in the upper node. As shown in FIG. 10, the 11.2 kbps signal of speech coding scheme A is first of all converted to an analogue signal in the conversion circuit and then converted again to a 64 kbps digital signal. Likewise, as shown in FIG. 11, the 5.6 kbps signal of speech coding scheme B is first of all converted to an analogue signal in the conversion circuit and then converted again to a 64 kbps digital signal.

As a result of these arrangements, when the party called by mobile station 11, which can use either speech coding scheme A or B, is mobile station 13, which also can use either speech coding scheme A or B, the communication can be carried out using the high-priority speech coding scheme provided by the radio zones. However, when the party called is mobile station 12 which can use only speech coding scheme B, the speech coding schemes have to be matched on the basis of speech coding scheme B, even when both of the mobile stations are communicating in a radio zone capable of handling speech coding scheme A or B. On the other hand, when the called party is a terminal of another communication network, the aforementioned mobile station 11 can communicate using the high-priority speech coding scheme provided by the radio zone, without being aware of the capability or location of the called party of the other communication network.

The explanation given of the embodiment of this invention has assumed that mobile stations 11–13 move physically among radio zones 1–4. However, in an actual mobile communication system, fluctuations in radio wave propagation may be accompanied by mobile stations 11–13 switching among radio zones 1–4 despite remaining in the same location. Explanations similar to those given above can be applied to this sort of situation as well.

The present invention therefore teaches a method for selecting a traffic channel with a bit rate corresponding to the speech coding scheme which has not been taught in any previous proposal regarding the matching of speech coding schemes. According to this invention, it is always possible to communicate on the basis of an optimum speech coding scheme which is matched to the speech coding schemes provided by the radio zones, and to the speech coding capability of the mobile stations. This is achieved by adding a new function whereby the speech coding capabilities of a mobile station that has made a SETUP request and of the mobile station to which the call is being made (these capabilities having been notified by a switch) are stored in a control station, which has a traffic channel selection function and grasps which speech coding scheme is currently being used in the radio zone which it controls. The effects of this invention include the ability to communicate using a high-priority speech coding scheme when handover occurs, which happens when channel selection takes place in another radio zone spanning control stations, or when a mobile station has moved to a radio zone in which a high-priority speech coding scheme can be used.

We claim:

1. Mobile communication system comprising:

a plurality of mobile stations, at least two of said plurality of mobile stations being connectable to each other;

at least one switch which switches and connects transmission routes between two of said plurality of mobile stations respectively connected to two of said plurality of base stations; and control stations which set and control the connection conditions of the base stations;

wherein at least one of said plurality of mobile stations can handle a single type of speech coding scheme, and at least one of said plurality of mobile stations can adaptively handle two or more different types of speech coding schemes;

the control stations include:

a table which temporarily stores, during the time interval from connection until release, conditions relating to the speech coding schemes of two connected mobile stations;

a means which independently selects the type of speech coding scheme on the basis of the content stored in said table without inquiry to or response from said at least one switch; and a means which, when at least one of the two mobile stations has been connected to another base station, transfers the connection conditions to the control station pertaining to the other base station.

2. Mobile communication system as set forth in claim 1, wherein at least one of the plurality of base stations is capable of handling a single type of speech coding scheme, and at least one of the plurality of base stations is capable of adaptively handling two or more different types of speech coding schemes.

3. Mobile communication system as set forth in claim 1 or 2, wherein an order of priority is set in advance for the speech coding schemes which can be used by at least one of the plurality of base stations which is capable of adaptively handling two or more different types of speech coding schemes.

4. Mobile communication system as set forth in any of claims 1 to 2, further comprising:

a database in which is recorded which of the plurality of mobile stations can handle which speech coding schemes; and said at least one switch includes a means which refers to said database when a connection is to be established by said switch and a means which transfers information recorded in said database to the control stations; and the control stations have a means which records the transferred information in the aforementioned table.

5. Mobile communication system as set forth in any of claims 1 to 2, wherein the at least one switch includes a means which, when a connection is to be established by said switch, determines which speech coding schemes the two mobile stations to be connected can handle, this being done via the channels used for the connection control, and by means of information from those mobile stations.

6. Mobile communication system comprising:

a plurality of mobile stations, at least two of said plurality of mobile stations being connectable to each other;

at least one switch which switches and connects transmission routes between two of said plurality of mobile stations respectively connected to two of said plurality of base stations; and control stations which set and control the connection conditions of the base stations;

wherein at least one of said plurality of mobile stations can handle a single type of speech coding scheme, and at least one of said plurality of mobile stations can adaptively handle two or more different types of speech coding schemes;

the control stations include:

a table which temporarily stores, during the time interval from connection until release, conditions relating to the speech coding schemes of two connected mobile stations;

a means which selects the type of speech coding scheme on the basis of the content stored in said table; and a means which, when at least one of the two mobile stations has been connected to another base station, transfers the connection conditions to the control station pertaining to the other base station;

an order of priority is set in advance for the speech coding schemes which can be used by the at least one of the plurality of base stations which is capable of adaptively handling two or more different types of speech coding schemes; and the speech coding scheme in use is changed in accordance with the order of priority when a mobile station capable of adaptively handling two or more different types of speech coding schemes has moved, during a call, from a radio zone of a base station capable of handling a single type of speech coding scheme, to a radio zone of a base station capable of adaptively handling two or more different types of speech coding schemes.

7. Mobile communication system comprising:

a plurality of mobile stations, at least two of said plurality of mobile stations being connectable to each other;

a plurality of base stations connected to said mobile stations by radio channels;

at least one switch which switches and connects transmission routes between two of said plurality of mobile stations respectively connected to two of said plurality of base stations; and control stations which set and control the connection conditions of the base stations;

wherein at least one of said plurality of mobile stations handle a single type of speech coding scheme, and at least one said plurality of mobile stations can adaptively handle two or more different types of speech coding schemes;

the control stations include:

a table which temporarily stores, during the time interval from connection until release, conditions relating to the speech coding schemes of two connected mobile stations;

a means which selects the type of speech coding scheme on the basis of the content stored in said table; and a means which, when at least one of the two mobile stations has been connected to another base station, transfers the connection conditions to the control stations pertaining to the other base station;

an order of priority is set in advance for the speech coding schemes which can be used by the at least one of the plurality of base stations capable of adaptively handling two or more different types of speech coding schemes; and the speech coding scheme in use is set in accordance with the order of priority when said mobile station capable of adaptively handling two or more different types of speech coding schemes accesses a control channel of a base station capable of handling a single type speech coding scheme, and communicates by means of a traffic channel of a base station capable of adaptively handling two or more different types of speech coding schemes.

8. Mobile communication system comprising:

a plurality of mobile stations;

at least one base station connected to said mobile stations by radio channels;

at least one switch which, for a mobile station connected to said at least one base station, connects a transmission route to a called party belonging to an upper node; and control stations which set and control the connection conditions of the base stations;

wherein, of the plurality of mobile stations, at least one of said plurality of mobile stations can adaptively handle two or more different types of speech coding schemes; and the aforementioned control stations include:

a table which temporarily stores, over a time interval from connection until release, conditions relating to the speech coding schemes of two connected mobile stations;

a means which independently selects the type of speech coding scheme on the basis of the content stored in the table without inquiry to or response from said at least one switch; and a means which, when at least one of two of said mobile stations has been connected to another base station, transfers the connection conditions to the control station pertaining to the other base station.

9. Mobile communication system comprising:

a plurality of mobile stations;

at least one base station connected to said mobile stations by radio channels;

at least one switch which, for a mobile station connected to said at least one base station, connects a transmission route to a called party belonging to a communication network connected to an upper node; and control stations which set and control the connection conditions of the base stations;

wherein, of the plurality of mobile stations, at least one of said plurality of mobile stations are capable of handling a single type of speech coding scheme, and at least one of said plurality of mobile stations are capable of adaptively handling two or more different types of speech coding schemes;

the upper node has a means which converts the speech coding scheme to the speech coding scheme applied to the communication network; and the control stations include:

a table which temporarily stores, over a time interval from connection until release, conditions relating to the speech coding schemes of two mobile stations which are connected;

a means which independently selects the type of speech coding scheme on the basis of the content stored in said table without inquiry to or response from said at least one switch; and a means which when at least one of the two mobile stations has been connected to another base station, transfers the connection conditions to the control station pertaining to the other base station.

10. Mobile communication system comprising:

a plurality of mobile stations, at least two of said plurality of mobile stations being connectable to each other;

at least one switch which switches and connects transmission routes between two of said plurality of mobile stations respectively connected to two of said plurality of base stations; and control stations which set and control the connection conditions of the base stations;

wherein at least one of said plurality of mobile stations can handle a single type of speech coding scheme, and at least one of said plurality of mobile stations an adaptively handle two or more different types of speech coding schemes;

the control stations include:

a table which temporarily stores, during the time interval from connection until release, conditions relating to the speech coding schemes of two connected mobile stations;

a means which selects the type of speech coding scheme on the basis of the content stored in said table; and a means which, when at least one of the two mobile stations has been connected to another base station, transfers the connection conditions to the control station pertaining to the other base station;

at least one of the plurality of base stations is capable of handling a single type of speech coding scheme, and at least one of the plurality of base stations is capable of adaptively handling two or more different types of speech coding schemes;

an order of priority is set in advance for the speech coding schemes which can be used by the at least one of the plurality of base stations is capable of adaptively handling two or more different types of speech coding schemes; and the speech coding scheme in use is changed in accordance with the order of priority when a mobile station capable of adaptively handling two or more different types of speech coding schemes has moved, during a call, from a radio zone of a base station capable of handling a single type of speech coding scheme, to a radio zone of a base station capable of adaptively handling two or more different types of speech coding schemes.

11. Mobile communication system comprising:

a plurality of mobile stations, at least two of said plurality of mobile stations being connectable to each other;

a plurality of base stations connected to said mobile stations by radio channels;

at least one switch which switches and connects transmission routes between two of said plurality of mobile stations respectively connected to two of said plurality of base stations; and control stations which set and control the connection conditions of the base stations;

wherein at least one of said plurality of mobile stations handle a single type of speech coding scheme, and can adaptively handle two or more different types of speech coding schemes;

the control stations include:

a table which temporarily stores, during the time interval from connection until release, conditions relating to the speech coding schemes of two connected mobile stations;

a means which selects the type of speech coding scheme on the basis of the content stored in said table; and a means which, when at least one of the two mobile stations has been connected to another base station, transfers the connection conditions to the control stations pertaining to the other base station;

at least one of the plurality of base stations is capable of handling a single type of speech coding scheme, and at least one of the plurality of base stations is capable of adaptively handling two or more different types of speech coding schemes;

an order of priority is set in advance for the speech coding schemes which can be used by the at least one of the plurality of base stations capable of adaptively handling two or more different types of speech coding schemes;

the speech coding scheme in use is set in accordance with the order of priority when mobile station capable of adaptively handling two or more different types of speech coding schemes accesses a control channel of a base station capable of handling a single type speech coding scheme, and communicates by means of a traffic channel of a base station capable of adaptively handling two or more different types of speech coding schemes.

* * * * *